(12) United States Patent
Zhang et al.

(10) Patent No.: US 9,431,949 B2
(45) Date of Patent: Aug. 30, 2016

(54) INDUCTION MOTOR SPEED ESTIMATION

(71) Applicant: General Electric Company, Schenectady, NY (US)

(72) Inventors: Pinjia Zhang, Clifton Park, NY (US); Prabhakar Neti, Rexford, NY (US); Patel Bhageerath Reddy, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 14/264,332

(22) Filed: Apr. 29, 2014

(65) Prior Publication Data

US 2015/0311849 A1    Oct. 29, 2015

(51) Int. Cl.

| H02P 23/00 | (2006.01) |
|---|---|
| H02P 25/00 | (2006.01) |
| H02P 27/00 | (2006.01) |
| H02P 23/08 | (2006.01) |
| H02P 23/14 | (2006.01) |
| H02P 27/02 | (2016.01) |

(52) U.S. Cl.
CPC .............. *H02P 23/08* (2013.01); *H02P 23/14* (2013.01); *H02P 23/16* (2016.02); *H02P 27/026* (2013.01)

(58) Field of Classification Search
CPC .............. H02P 27/026; H02P 21/146; H02P 23/0045; H02P 27/02; H02P 21/0035
USPC .......................................................... 318/799
See application file for complete search history.

(56) References Cited

U.S. PATENT DOCUMENTS

| 4,484,129 A | | 11/1984 | Ono | |
|---|---|---|---|---|
| 4,751,814 A | * | 6/1988 | Farrell | F02C 1/04 60/39.183 |
| 4,761,703 A | * | 8/1988 | Kliman | H02H 7/08 318/798 |
| 4,785,621 A | * | 11/1988 | Alderson | C10J 3/16 60/39.12 |
| 4,785,634 A | * | 11/1988 | Alderson | F02C 1/04 60/648 |
| 5,442,904 A | * | 8/1995 | Shnaid | F02C 6/18 60/39.183 |
| 5,754,026 A | | 5/1998 | Hampo et al. | |
| 5,927,065 A | * | 7/1999 | Cotton | F02C 1/04 60/39.183 |
| 6,050,082 A | * | 4/2000 | Leonard | F02C 3/10 60/39.183 |

(Continued)

FOREIGN PATENT DOCUMENTS

| DE | 102006008048 A1 | 9/2006 |
|---|---|---|
| EP | 2120327 A2 | 11/2009 |

OTHER PUBLICATIONS

Gomez et al., "Estimation of Induction Motor Efficiency In-Situ Under Unbalanced Voltages Using Genetic Algorithms", 18th International Conference on Electrical Machines, Sep. 6-9, 2008, pp. 1-4.

(Continued)

*Primary Examiner* — Kawing Chan
*Assistant Examiner* — Bradley Brown
(74) *Attorney, Agent, or Firm* — Nitin N. Joshi

(57) ABSTRACT

A method for estimating a speed of an induction motor includes applying a voltage to the induction motor and measuring a current of the induction motor. A current fast fourier transform (FFT) of the current is then determined and a slip of the induction motor is calculated based on the current FFT. A speed of the induction motor is then estimated based on the slip of the induction motor.

14 Claims, 3 Drawing Sheets

(56) References Cited

U.S. PATENT DOCUMENTS

| | | | |
|---|---|---|---|
| 6,137,258 | A | 10/2000 | Jansen |
| 6,683,428 | B2 | 1/2004 | Pavlov et al. |
| 6,713,978 | B2 * | 3/2004 | Parlos .................. G06N 3/0454 318/268 |
| 6,772,582 | B2 * | 8/2004 | Reissig .................... F02C 1/04 60/39.183 |
| 6,828,751 | B2 | 12/2004 | Sadasivam et al. |
| 7,193,387 | B1 | 3/2007 | Lu et al. |
| 7,227,326 | B1 | 6/2007 | Lu et al. |
| 8,102,140 | B2 | 1/2012 | Gao et al. |
| 8,566,056 | B2 * | 10/2013 | Lu ............................ G01P 3/48 702/142 |
| 9,130,499 | B2 * | 9/2015 | Lu ............................ G01P 3/48 |
| 2009/0140681 | A1 * | 6/2009 | Hauttmann ............... G01P 3/44 318/490 |
| 2009/0284212 | A1 * | 11/2009 | Turner .................... H02P 23/14 318/767 |
| 2011/0213589 | A1 * | 9/2011 | Lu .......................... H02P 23/14 702/182 |
| 2012/0007533 | A1 * | 1/2012 | Ogawa ................ H02M 7/5387 318/503 |
| 2014/0009102 | A1 * | 1/2014 | Lu ............................ G01P 3/48 318/808 |

OTHER PUBLICATIONS

"Determining Electric Motor Load and Efficiency," Motor Challenge, Department of Energy, United States of America, Mar. 21, 2013 (download date), pp. 1-16.

S.C. Smith et al.,"Fourier Based Three Phase Power Metering System," IEEE, vol. 1, May 1, 2000-May 4, 2000, pp. 30-35.

Beguenane R et al., "Design of Slip Frequency Detector with Improvement Accuracy for Induction Motor Rotor Parameters Updating", 6th. European Conference on Power Electronics and Applications, vol. 3, pp. 3.417-3.422, Sep. 19, 1995.

European Search Report issued in connection with corresponding EP Application No. EP15164509 on Jan. 25, 2016.

Shi D., et al., "Sensorless Speed Measurement of Induction Motor Using Hilbert Transform and Interpolated Fast Fourier Transform", IEEE Transactions on Instrumentation and Measurement, vol. 55(1), pp. 290-299, Feb. 1, 2006.

Wang C., et al., "Sensorless Speed Measurement of Induction Machines Using Short Time Fourier Transformation", Power Electronics, Electrical Drives, Automation and Motion, pp. 1114-1119, 2008.

* cited by examiner

INDUCTION MOTOR SPEED ESTIMATION

BACKGROUND

Embodiments of invention relate to inductor motors and more specifically to speed estimation of inductor motors.

Industrial motors are critical components of industrial applications. Failure of industrial motors not only leads to repair of the motors themselves, but also causes production loss, which usually is more costly than the motor itself. The cost associated with the repair or maintenance of motors can be minimized by closely monitoring the motor's health condition and schedule maintenance in a proactive manner. Therefore, monitoring the health condition of motors during operation is highly desired by the customer to minimize outage and the associate cost with motor maintenance and repair.

Induction motors are one of the most commonly used motors in industrial applications. The most typical failure mode of large induction motors include stator inter-turn fault, broken rotor bar, defective bearing, rotor eccentricity, shaft misalignment, foundation looseness etc. Reliable detection of these failures at incipient stage is critical for the condition monitoring of these motors. In addition to the motor anomaly detection, performance estimation, including the motor's output torque, efficiency, energy usage, etc., is another critical set of parameters to monitor for induction motors. Any trending of these performance related parameters may indicate abnormal condition of the motor's operation.

A rotor speed measurement of induction motor is required by many monitoring and diagnostics modules, such as torque estimation, efficiency estimation, broken rotor bar detection, etc. Furthermore, for closed loop control of induction motors, speed determination is necessary.

Therefore, there exists a need for a system and a method for determining speed of induction motors.

BRIEF DESCRIPTION

In accordance with an embodiment of the present technique, a method for estimating a speed of an induction motor is provided. The method includes applying a voltage to the induction motor, measuring a current of the induction motor and determining a current fast fourier transform (FFT) of the current. The method further includes determining a slip of the induction motor based on the current FFT and estimating the speed of the induction motor based on the slip of the induction motor.

In accordance with another embodiment of the present technique, a system including a power supply to provide a voltage to an induction motor and a measurement unit to measure a current of the induction motor is provided. The system also includes a processor to estimate a speed of the induction motor. The processor includes a fast fourier transform (FFT) module to determine a current FFT of the current, a slip calculation module to determine a slip of the induction motor based on the current FFT and a speed calculation module to estimate a speed of the induction motor based on the slip of the induction motor.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, the terms "circuit" and "circuitry" and "controller" may include either a single component or a plurality of components, which are either active and/or passive and are connected or otherwise coupled together to provide the described function.

Figure 1:
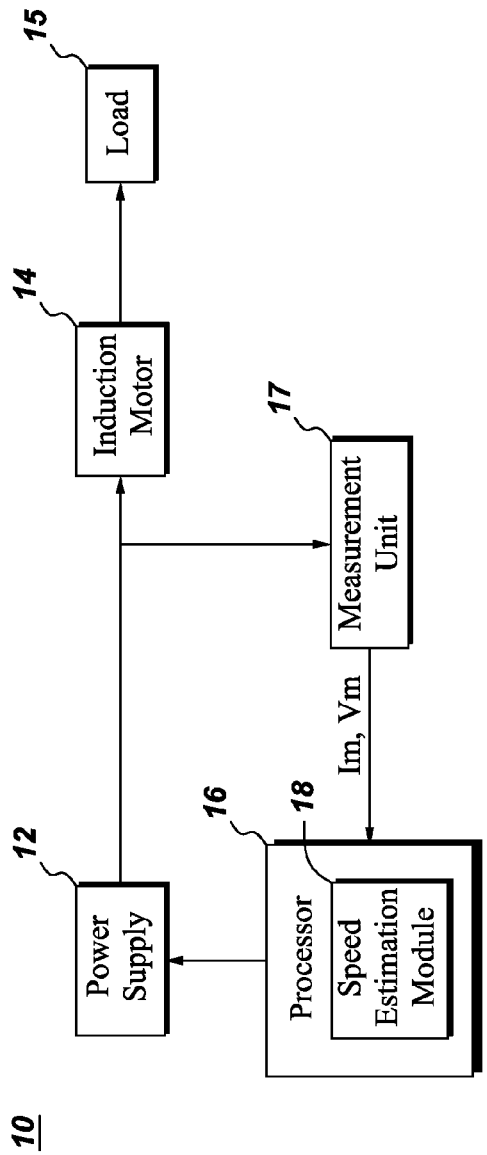
FIG. 1 is a diagrammatical representation of a system for an induction motor control.

Turning now to the drawings, by way of example in FIG. 1, a system 10 for induction motor speed estimation is depicted. In one embodiment, the system 10 for induction motor speed estimation may include a power supply 12, an induction motor 14, a measurement unit 17, a load 15 and a processor 16. In one embodiment, the power supply 12 may include an alternating current source such as a generator or a power grid. In another embodiment, the power supply 12 may include a power converter such as a direct current (DC) to alternating current (AC) converter. In addition, the induction motor 14 may be a three phase motor and so power supply 12 may also be a three phase power supply. Also, the load 15 may include a mechanical load such as an overhead crane, a compressor, an industrial drive, an electric vehicle, and the like.

In general, induction motor 14 includes a stator (not shown) and a rotor (not shown). The power supply 12 applies a voltage across the stator and the load 15 is connected to the rotor via a mechanical shaft. When the voltage is applied across the stator of the induction motor 14, it produces a rotating magnetic field which induces currents in the rotor of the induction motor. The rotor in turn produces another magnetic field and the interaction between the rotating magnetic field and the rotor magnetic field causes the rotor to rotate and in turn the load 15 rotates. Measurement unit 17 measures a current and the voltage of the induction motor and provides it to processor 16. It should be noted that system 10 may further include analog to digital converters, digital to analog converters, filters and other elements which may be needed for overall operation but are not shown in FIG. 1.

Processor 16 includes a speed estimation module 18 which estimates a speed of the induction motor based on various measurements. In one embodiment, processor 16 may also control various motor parameters of the induction motor including speed, torque etc. Processor 16 may provide control signals to power supply 12 which in turn controls applied voltage/frequency across the induction motor to control the motor parameters.

Processor 16 may include a computer, a digital signal processor (DSP) or a Field Programmable Gate Arrays (FPGA). Also, the functions of the processor 16 may be implemented in a variety of programming languages, including but not limited to Ruby, Hypertext Pre-processor (PHP), Perl, Delphi, Python, C, C++, or Java. Such code may be stored or adapted for storage on one or more tangible, machine-readable media, such as on data repository chips, local or remote hard disks, optical disks (that is, CDs or DVDs), solid-state drives, or other media, which may be accessed by the processor-based system to execute the stored code. Further, in certain embodiments, the system 10 may include a display unit (not shown). In some embodiments, the display unit may form part of the processor 16 or the speed estimation module 18.

Figure 2:
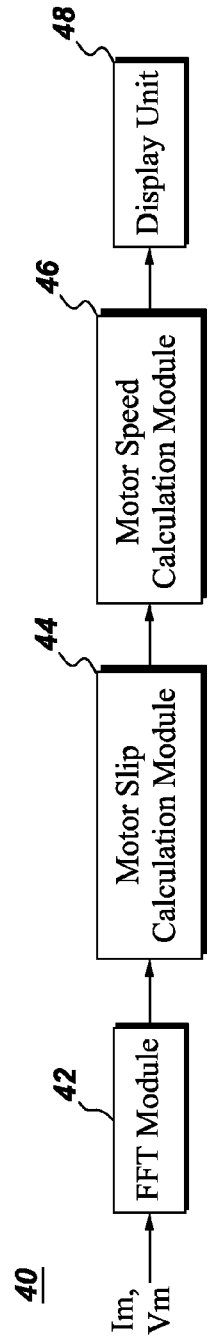
FIG. 2 is a diagrammatical representation of an exemplary embodiment of a speed estimation module for use in the system of FIG. 1, according to aspects of the present disclosure.

Referring now to FIG. 2, a diagrammatical representation of an exemplary embodiment of a speed estimation module 40 for use in the system of FIG. 1 according to aspects of the present disclosure is depicted. In one embodiment, speed estimation module 40 includes a Fast Fourier Transform (FFT) module 42, a motor slip calculation module 44, a motor speed calculation module 46 and a display unit 48.

FFT module 42 may receive inputs such as a motor voltage $v_m$ and a motor current $i_m$. It should be noted that motor voltage $v_m$ and motor current $i_m$ may be three phase quantities. FFT module 42 transforms time domain motor voltage $v_m$ and motor current $i_m$ signals into frequency domain signals. In other words FFT module 42 generates a frequency spectrum of motor voltage $v_m$ and motor current Generating the frequency spectrum includes determining magnitudes and phases of various component frequencies (i.e., harmonics) of signals $v_m$ and Various FFT algorithms may be utilized by FFT module 42 to generate the frequency spectrum. Examples of FFT algorithms include Prime-factor FFT algorithm, Brunn's FFT algorithm, Cooley-Tukey FFT algorithm etc. In one embodiment, a formula used to transform time domain motor current $i_m$ and motor voltage $v_m$ into frequency domain may be given as:

$$I_k = \sum_{n=0}^{N-1} i_{mn} e^{-i2\pi k \frac{n}{N}} \quad (1)$$

$$k = 0, \ldots, N-1$$

$$V_k = \sum_{n=0}^{N-1} v_{mn} e^{-i2\pi k \frac{n}{N}} \quad (2)$$

$$k = 0, \ldots, N-1$$

where k is a harmonic number varying from 0 to N−1, n is a sample number varying from 0 to N−1, and $I_k$ and $V_k$ are motor current and motor voltage at $k^{th}$ frequency respectively. As can be seen from above equations both $I_k$ and $V_k$ have a real component and an imaginary components and can further be represented as:

$$I_k = A_k + jB_k \, k=0, \ldots, N-1 \quad (3)$$

$$V_k = C_k + jD_k \, k=0, \ldots, N-1 \quad (4)$$

where A and B are real and imaginary components of the motor current and C and D are real and imaginary components of the motor voltage respectively. Equations (3) and (4) can further provide magnitude and phase of $k^{th}$ harmonic and thus, magnitude and phase spectrums can be obtained. For example, a magnitude of the motor current for $k^{th}$ harmonic can be given as $\sqrt{A_k^2 + B_k^2}$ and a phase of the motor current for the $k^{th}$ harmonic can be given as $\tan^{-1}(B_k/A_k)$.

Referring back to FIG. 2, in an embodiment, motor slip calculation module 44 determines a motor slip of the motor for a given condition based on the motor current FFT as given by equation (3) or the respective magnitude spectrum discussed above. In an alternative embodiment, motor slip calculation module 44 determines the motor slip based on electric power P consumed by the motor for the given condition. The electric power P may further be calculated based on the motor current FFT and the motor voltage FFT given by equations (3) and (4) above. Details of both embodiments of slip calculation module 44 mentioned above will be discussed with respect to FIGS. 2 and 3 respectively.

Once the motor slip is calculated by motor slip calculation module 44, the motor speed calculation module 46 estimates the speed of the induction motor based on the motor slip and may display it on the display unit 48. In one embodiment, motor speed calculation module 46 estimates the speed of the induction motor based on the following equation:

$$\omega_r = \omega_s \times (1-s) \quad (5)$$

where $\omega_r$ is the speed of the induction motor in revolutions/minute, $\omega_s$ is a synchronous speed of the induction motor in revolutions/minute and s is the motor slip. The synchronous speed of the induction motor may be calculated by following equation:

$$\omega_s = 120 \times f/p \quad (6)$$

where f is a rated frequency of the induction motor and p is a number of poles of the induction motor.

Figure 3:
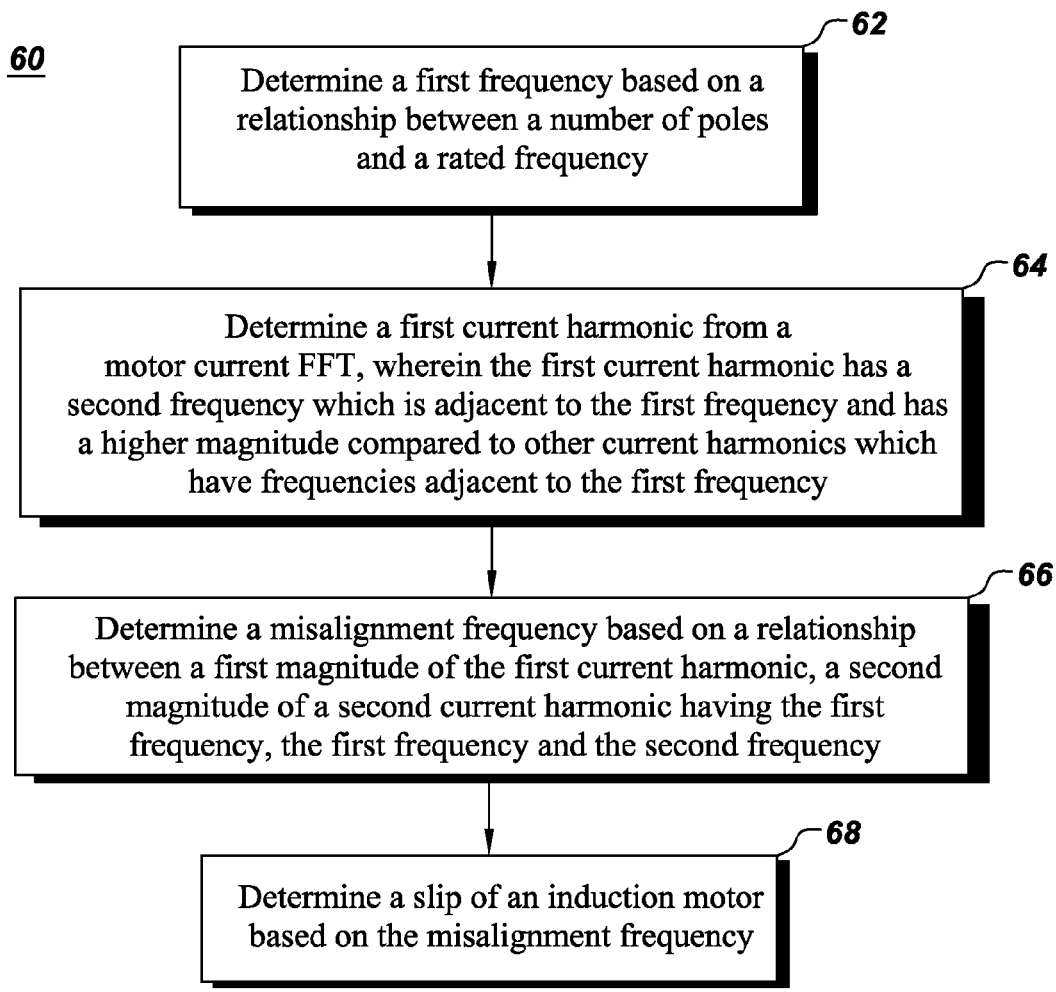
FIG. 3 is a diagrammatical representation of an exemplary embodiment of a motor slip calculation method used in FIG. 2, according to aspects of the present disclosure.

Referring now to FIG. 3, diagrammatical representation 60 of an exemplary embodiment of a slip calculation method used in motor calculation module 44 of FIG. 2 is depicted. The slip calculation method 60 includes determining a first frequency in step 62. The first frequency may also be referred to as an approximate mis-alignment frequency $f_{mis-approx}$ and is determined based on a relationship between the number of poles p and the rated frequency f of the induction motor. In one embodiment, an actual mis-alignment frequency $f_{mis}$ may be given by equation:

$$f_{mis} = f\left[1 \pm k\frac{(1-s)}{p}\right] \quad (7)$$

where s is the motor slip, k is an harmonic dependent integer. In one embodiment, k is equal to 1. It should be noted that the mis-alignment frequency is a harmonic signal which is a result of the shaft misalignment of the induction motor and which can be used to evaluate the speed of the induction motor. Since motor slip s which is generally very small is not known at this step, it is approximated or substituted to be zero i.e., s=0. Thus, the approximate misalignment frequency $f_{mis\text{-}approx}$ is then given as $$f_{mis\text{-}approx} = f[1 \pm k/p] \quad (8)$$

Slip calculation method 60 further includes determining a first current harmonic in step 64. The first current harmonic is determined from the motor current FFT and has a second frequency $f_2$ which is adjacent to the first frequency $f_{mis\text{-}approx}$. The first motor current harmonic also has a higher magnitude compared to other current harmonics having frequencies adjacent to the first frequency. For example, assume the first frequency is 48 Hz and there are two current harmonics with frequencies 47.9 Hz and 48.1 Hz which are adjacent to the first frequency. If the two current harmonics (47.1 Hz and 48.1 Hz) have magnitudes 0.9 per unit (pu) and 0.94 pu respectively, then the second frequency selected would be the frequency 48.1 Hz. This is so because the current harmonic of frequency 48.1 Hz has relatively higher magnitude compared to other current harmonics having adjacent frequencies to the first frequency.

Once the first current harmonic is determined, step 66 includes determining the actual misalignment frequency $f_{mis}$ based on a first magnitude $mag_1$ of the first current harmonic, a second magnitude $mag_2$ of a second current harmonic having the first frequency and the values of the first frequency $f_{mis\text{-}approx}$ and the second frequency $f_2$. In one embodiment, the misalignment frequency $f_{mis}$ may be given as $$f_{mis} = (1-b)f_{mis\ approx} + b^*f_2 \quad (9)$$

where $b=(2a-1)/(a+1)$ and $a=mag_2/mag_1$.

Slip calculation method 60 further includes determining the motor slip based on the misalignment frequency $f_{mis}$ in step 68. The motor slip s may be calculated as $$s = 1 \pm \frac{p}{k}\left(\frac{f_{mis}}{f} - 1\right) \quad (10)$$

where again f is the rated frequency of the induction motor, p is the number of poles of the induction motor and k is an integer. This motor slip may then be utilized to determine the motor speed as per equation (5).

Figure 4:
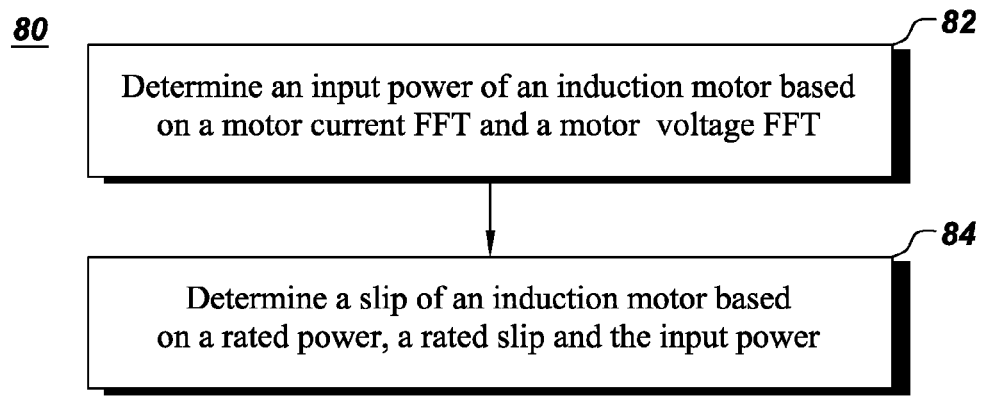
FIG. 4 is a diagrammatical representation of another embodiment of a motor slip calculation method used in FIG. 2, according to aspects of the present disclosure.

Referring now to FIG. 4, diagrammatical representation 80 of another exemplary embodiment of a slip calculation method used in motor calculation module 44 of FIG. 2 is depicted. The slip calculation method 80 includes determining an input power $P_{input}$ of the induction motor in step 82. The input power of the induction motor is determined based on a relationship between the motor current FFT and the motor voltage FFT. In one embodiment, the input power $P_{input}$ may be given by equation:

$$P_{input} = 3 \times \Sigma_{k=0}^{N/2-1} A_k C_k + B_k D_k \quad (11)$$

where $A_k$, $C_k$ are real components of the phase current $I_k$ and phase voltage $V_k$ respectively and $B_k$, $D_k$ are imaginary components of the phase current $I_k$ and phase voltage $V_k$ respectively. Furthermore, k is the harmonic number varying from 0 to N/2−1 where N is the number of samples of time domain phase current $I_k$ and/or phase voltage $V_k$. In another embodiment, where the induction motor may be unbalanced, the input power $P_{input}$ may be determined by determining input power for each phase separately and then adding them together.

The slip calculation method 80 further includes determining the motor slip s in step 84. In this embodiment, the motor slip s is determined based on a relationship between a rated power $P_{rated}$, a rated slip $s_{rated}$ and the input power $P_{input}$ of the induction motor, i.e., $$s = P_{input} * s_{rated}/P_{rated} \quad (12)$$

$$s_{rated} = (\omega_s - \omega_{r\_rated})/\omega_s \quad (13)$$

where $\omega_{r\_rated}$ is the rated speed of the induction motor and $\omega_s$ is the synchronous speed of the induction motor determined as per equation (6). Both rated power $P_{rated}$ and rated speed $\omega_{r\_rated}$ may be determined from the induction motor name plate. This motor slip may then be utilized to determine the motor speed as per equation (5).

Figure 5:
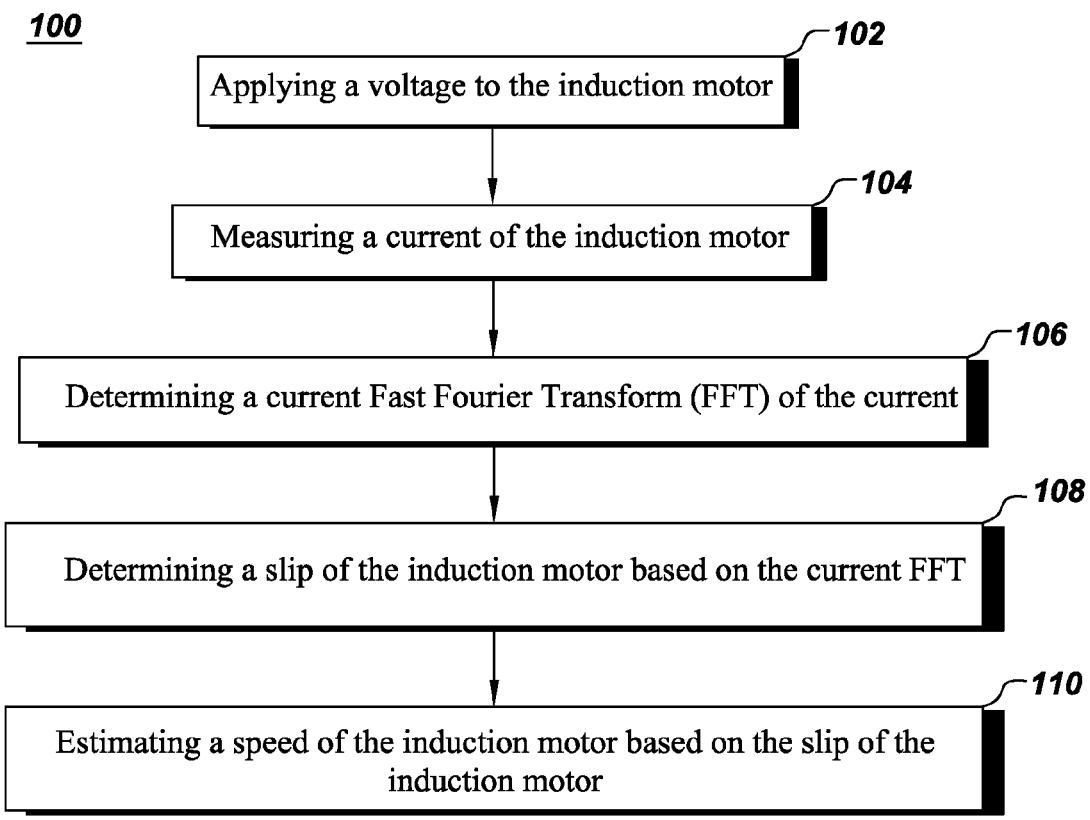
FIG. 5 is a flow chart representation of a method of estimating speed of an induction motor, according to aspects of the present disclosure.

Referring now to FIG. 5, a flow chart representation 100 of a method for estimating a speed of an induction motor is depicted. In step 102, the method 100 includes applying a motor voltage to the induction motor. The motor voltage may be a three phase voltage and may be applied via a DC to AC converter. In step 104, a motor current of the induction motor is measured and in step 106, a current fast fourier transform of the motor current is determined. Various FFT algorithms may be utilized determine the motor current FFT. Examples of FFT algorithms include Prime-factor FFT algorithm, Brunn's FFT algorithm, Cooley-Tukey FFT algorithm etc. In step 108, a motor slip of the induction motor is determined based on the motor current FFT and finally in step 110, the speed of the induction motor is estimated based on the motor slip.

Advantages of the present technique include sensorless speed measurement which enables online motor health monitoring. Furthermore, the technique is a low cost solution and has high accuracy and low dependence on data quality.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for estimating a speed of an induction motor, comprising applying a voltage to the induction motor;
    measuring a current of the induction motor;
    determining a current fast fourier transform (FFT) of the current;
    determining a slip of the induction motor based on the current FFT;
    estimating the speed of the induction motor based on the slip of the induction motor;
    wherein the slip of the induction motor is determined based on a misalignment frequency calculated from the current harmonic, a rated frequency and a number of poles;
    wherein determining the slip of the induction motor further comprises determining a first frequency of the induction motor based on a relationship between the rated frequency and the number of poles of the induction motor; and
    determining a first current harmonic from a motor current FFT, wherein the first current harmonic has a second frequency which is adjacent to the first frequency and has a higher magnitude compared to other current harmonics which have frequencies adjacent to the first frequency.

2. The method of claim 1, wherein determining the current FFT includes transforming a time domain current signal into a frequency domain current signal.

3. The method of claim 1, wherein determining the current FFT includes utilizing a Prime-factor FFT algorithm, a Brunn's FFT algorithm or a Cooley-Tukey FFT algorithm.

4. The method of claim 1, wherein the current FFT includes a plurality of magnitudes and phases of current harmonics.

5. The method of claim 1 comprising determining the misalignment frequency of the induction motor based on a relationship between a first magnitude of the first current harmonic, a second magnitude of a second current harmonic having the first frequency, the first frequency and the second frequency.

6. The method of claim 1 comprising determining a voltage fast fourier transform (FFT) of the voltage.

7. The method of claim 6, wherein determining the slip of the induction motor comprises determining a relationship between a rated power and a rated slip of the induction motor and an input power of the induction motor.

8. The method of claim 7, wherein the input power of the induction motor is determined based on the voltage FFT and the current FFT.

9. A system, comprising:
a power supply to provide a voltage to an induction motor;
a measurement unit to measure a current of the induction motor;
a processor to estimate a speed of the induction motor, the processor comprising:
a fast fourier transform (FFT) module to determine a current FFT of the current;
a slip calculation module to determine a slip of the induction motor based on the current FFT;
a speed calculation module to estimate a speed of the induction motor based on the slip of the induction motor;
wherein the slip calculation module determines the slip of the induction motor based on a misalignment frequency calculated from the current harmonic, a rated frequency and a number of poles;
wherein the slip calculation module is configured to determine a first frequency of the induction motor based on a relationship between the rated frequency and the number of poles of the induction motor; and
wherein the processor is further configured to determine a first current harmonic from a motor current FFT, wherein the first current harmonic has a second frequency which is adjacent to the first frequency and has a higher magnitude compared to other current harmonics which have frequencies adjacent to the first frequency.

10. The system of claim 9, wherein the power supply comprises a direct current (DC) to alternating current (AC) converter.

11. The system of claim 9, wherein the processor is further configured to determine the misalignment frequency of the induction motor based on a relationship between a first magnitude of the first current harmonic, a second magnitude of a second current harmonic having the first frequency, the first frequency and the second frequency.

12. The system of claim 9, wherein the FFT module is further configured to determine a voltage fast fourier transform (FFT) of the voltage.

13. The system of claim 12, wherein the slip calculation module is further configured to determine the slip based on a relationship between a rated power and a rated slip of the induction motor and an input power of the induction motor.

14. The system of claim 13, wherein the processor is further configured to determine the input power of the induction motor based on the voltage FFT and the current FFT.

* * * * *